(No Model.)
J. PERRY.
MACHINE FOR COMMINUTING MEAT AND OTHER FOOD.
No. 306,515. Patented Oct. 14, 1884.
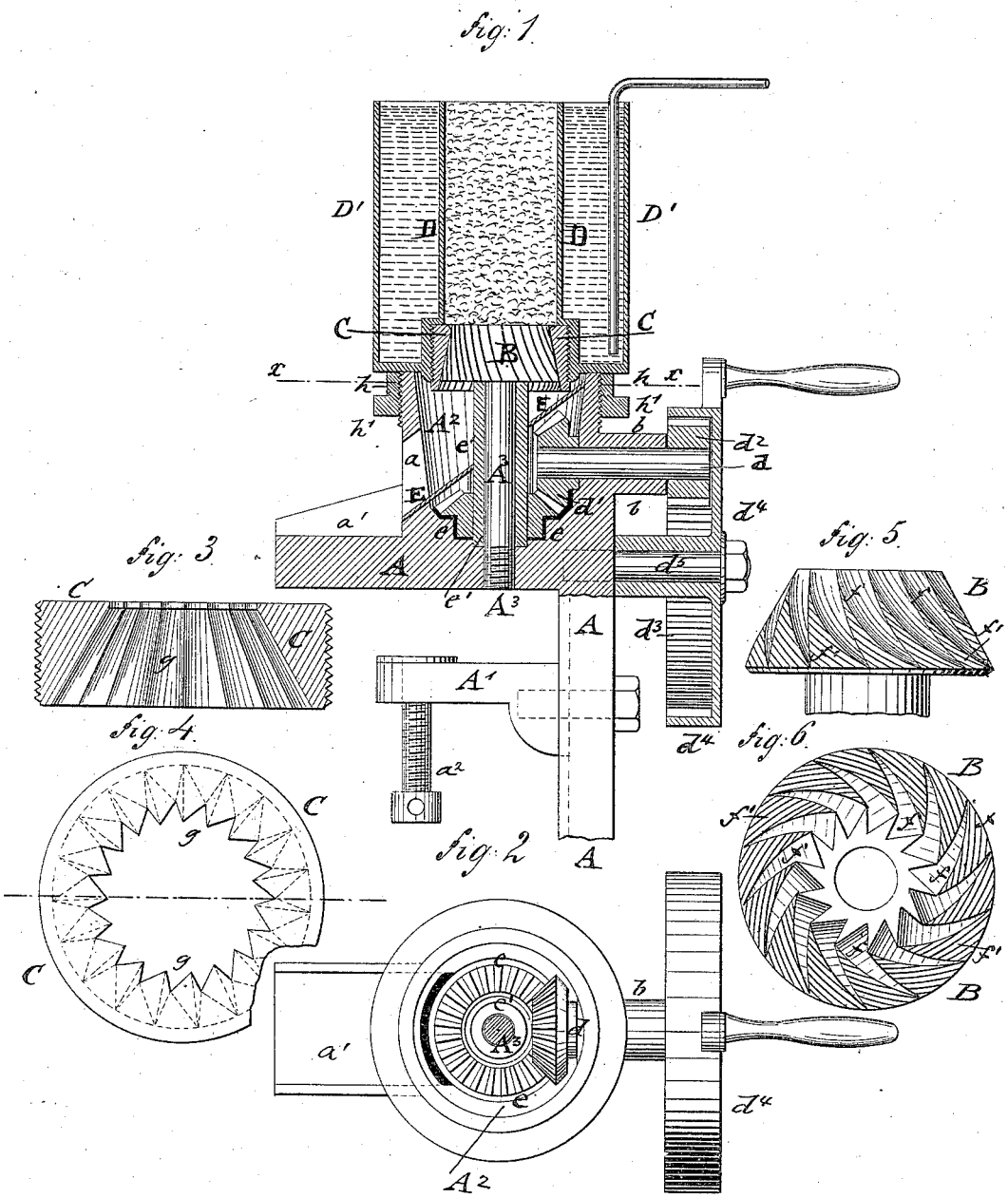
WITNESSES:
A. Schehl
Otto Risch
INVENTOR
James Perry
BY Goepel & Raegener
ATTORNEYS.

UNITED STATES PATENT OFFICE.

JAMES PERRY, OF BROOKLYN, NEW YORK.

MACHINE FOR COMMINUTING MEAT AND OTHER FOOD.

SPECIFICATION forming part of Letters Patent No. 306,515, dated October 14, 1884.

Application filed August 10, 1883. (No model.)

*To all whom it may concern:*

Be it known that I, JAMES PERRY, of Brooklyn, in the county of Kings and State of New York, have invented certain new and useful Improvements in Machines for Comminuting Meat and other Food, of which the following is a specification.

The object of this invention is to furnish an improved machine for comminuting meat and other food, so that the same becomes capable of being readily digested by persons who have lost their teeth, or who are otherwise incapable of thoroughly masticating their food.

In the accompanying drawings, Figure 1 represents a vertical central section of my improved machine for comminuting meat and other food. Fig. 2 is a horizontal section on line $x\ x$, Fig. 1, with the shedding-plate removed. Figs. 3 and 4 are respectively a detail vertical central section and a plan of the grinding-ring, and Figs. 5 and 6 are a detail side and top view of the conical revolving grinder.

Similar letters of reference indicate corresponding parts.

Referring to the drawings, A represents the angular supporting-frame of my improved machine for comminuting food. The supporting-frame A is provided with a bracket-plate, A', through which a clamp-screw, $a^2$, is passed, by which the frame A is rigidly secured, in connection with its horizontal portion, to a table or other suitable means of support. At the upper part of the frame A is arranged a receiver, $A^2$, of hollow cylindrical shape, which is made slightly tapering at its interior surface. The receiver $A^2$ is provided at one side with an opening and bearing, $b$, for a horizontal shaft, $d$, to the inner end of which a bevel-wheel, $d'$, is keyed, while the outer end of said shaft carries a pinion, $d^2$, that is engaged by an internal gearing, $d^3$, of a crank-wheel, $d^4$, the hub of which turns on a fixed horizontal shaft or arbor, $d^5$, as shown clearly in Fig. 1. The interior bevel-gear, $d'$, meshes with a second bevel-gear, $e$, at the lower end of a hollow steel shaft, $e'$, through which passes a vertical steadying-post, $A^3$, that is rigidly secured at its lower end to the frame A. To the upper end of the shaft $e'$ is applied a conical grinder, B, through which the fixed post $A^3$ also extends, and which thereby serves to steady the grinder while it is revolved by the bevel-gears described. The conical grinder B is provided with curved recesses $f$, that are deepest at their upper ends and gradually diminish in depth toward the lower edge, as shown in Figs. 5 and 6. The conical surface or lands between the edges of said recesses are provided with diagonal ribs and intermediate grooves, $f'$, cut into the surface of the grinder. A fixed grinding-ring, C, encircles the revolving grinder B, and is provided with recesses $g$, diminishing in depth, like the recesses $f$ of the grinding-cone B, as shown clearly in Figs. 3 and 4. The grinding-ring C is screwed into a socket at the lower part of a hopper, D, which is screwed by a collar, $h$, having an interior screw-thread, on the threaded outer surface of the receiver $A^2$ until the collar $h$ abuts against a screw-ring, $h'$, which serves to secure thereby the reservoir and grinding-ring rigidly in position on the receptacle $A^2$. By adjusting the grinding-ring and reservoir higher or lower, by means of the collar $h$ and ring $h'$, the distance between the grinding-ring and revolving cone is increased or diminished, and thereby the food ground or comminuted to a smaller or greater degree of fineness. The hopper can also be readily detached from the receiver, so that all the parts can be readily removed and cleaned.

Below the revolving grinder B there is arranged at the interior of the receiver $A^2$ an inclined conducting-plate, E, which extends from the upper part of the receiver $A^2$ over the gearing $d'\ e$ to the lower part of receiver at the opposite side, where it communicates with a discharge-opening, $a$, in the side wall of the receiver $A^2$, and with a discharge-spout, $a'$, of frame A, as shown clearly in Figs. 1 and 2. The conducting-plate E is tightly fitted around the shank, and serves to incase and protect the bevel-gears $d'$ against clogging.

The reservoir or hopper D is preferably made of cylindrical shape and surrounded by a jacket, D', to which hot or cold water of a higher or lower temperature is supplied, according as the food to be ground is to be eaten warm or cold.

When meat, fish, or other like food is to be comminuted, it is first cut into small pieces, which are placed in the reservoir D, and then pressed downward by a wooden or other piston, so as to be fed to and be taken up by the grinding-ring and grinder. When vegetables—such as onions, beets, &c.—are to be ground, they are first cut in slices, and then passed through the grinding mechanism, which cuts and comminutes the food, so that when the same is used it is in a form to be readily swallowed and digested with little, if any, mastication.

The machine on a smaller scale is designed for use at table, so that persons with bad teeth or diseased stomachs can readily comminute their food without the trouble of mastication, while machines on a larger scale may be used for comminuting food in larger quantities to be made up in air-tight cans for sale.

Having thus described my invention, I claim as new and desire to secure by Letters Patent—

1. The combination, in a machine for comminuting meat, of a rotary truncated cutting-cone having its smaller end upward, the skirt of said cone being provided with grinding-lands which gradually broaden from the upper end to the base of the cone, and with intermediate recesses gradually enlarged and deepened from the base to the upper end of the cone, and a conical ring adapted to fit over said cone and provided on its inner face with alternating lands and recesses corresponding to those of the cone, substantially as described.

2. In a machine for comminuting food, the combination of a cylindrical receiver having an exterior screw-thread and a screw-ring at its upper end, a receptacle or hopper having a threaded bottom collar for screwing on said receiver, a fixed grinding-ring secured to the lower part of the hopper, an interior grinding-cone, and means whereby revolving motion is imparted to the grinding-cone, substantially as set forth.

In testimony that I claim the foregoing as my invention I have signed my name in presence of two subscribing witnesses.

JAMES PERRY.

Witnesses:
PAUL GOEPEL,
SIDNEY MANN.